United States Patent [19]

Brown

[11] 4,058,088
[45] Nov. 15, 1977

[54] OSCILLATING PISTON ENGINE

[76] Inventor: Jesse C. Brown, 307 Walter Ave., Delanco, N.J. 08075

[21] Appl. No.: 713,531

[22] Filed: Aug. 11, 1976

Related U.S. Application Data

[63] Continuation-in-part of Ser. No. 564,782, April 3, 1975, Pat. No. 3,974,801.

[51] Int. Cl.² .................................... F02B 53/00
[52] U.S. Cl. .......................... 123/18 R; 123/43 R; 123/61 R; 123/58 R; 92/56; 92/67
[58] Field of Search ................. 123/43 R, 43 C, 18 R, 123/18 A

[56] References Cited

U.S. PATENT DOCUMENTS

| 975,485 | 11/1910 | Waltman | 123/43 R |
|---|---|---|---|
| 3,823,697 | 7/1974 | Esch | 123/43 R |
| 3,854,284 | 12/1974 | Denker | 123/43 C |
| 3,974,801 | 8/1976 | Brown | 123/43 R |
| 4,010,716 | 3/1977 | Minka | 123/8.47 |

Primary Examiner—Clarence R. Gordon
Attorney, Agent, or Firm—Stanley B. Kita

[57] ABSTRACT

An oscillating piston engine capable of running on a working fluid such as steam or compressed air comprises a bank of cylinders mounted for rotation in unison to turn a shaft in an engine block, pistons mounted for oscillation in the cylinders and rotatable in unison relative to the cylinders to turn another shaft in the engine block, control means operable in response to rotation of the cylinders for supplying and exhausting working fluid to and from opposite ends of the cylinders in alternating timed relation to cause the pistons to oscillate in the cylinders and pistons, and gearing means connecting the piston shaft and the cylinder shaft to an output shaft for converting the oscillating motion of the pistons and cylinders into unidirectional rotation of the output shaft.

4 Claims, 22 Drawing Figures

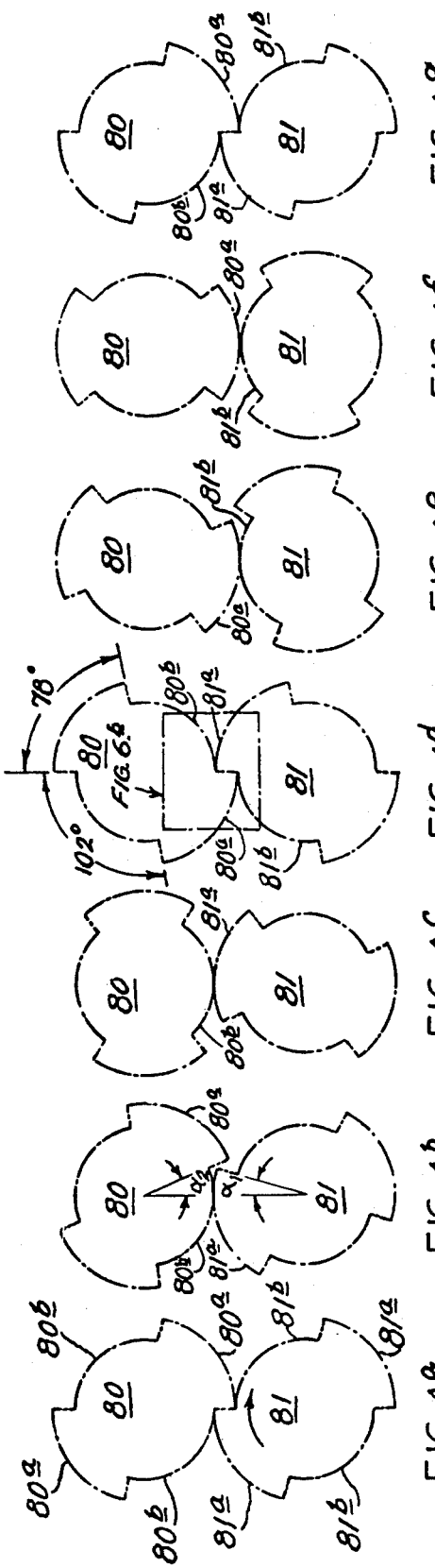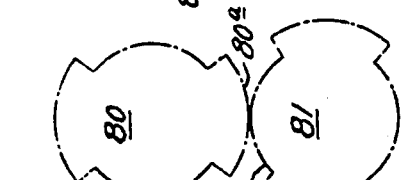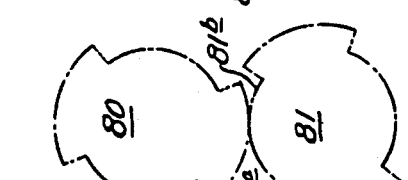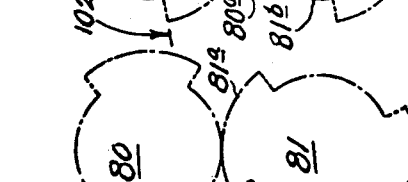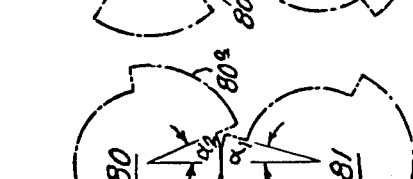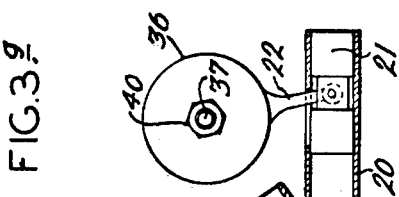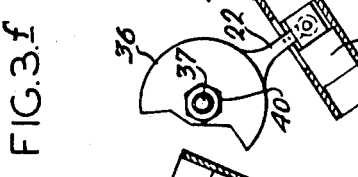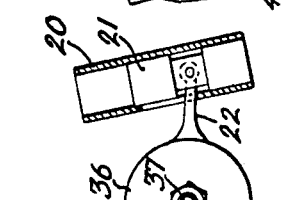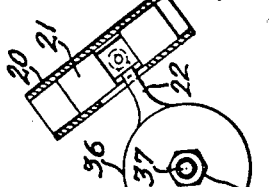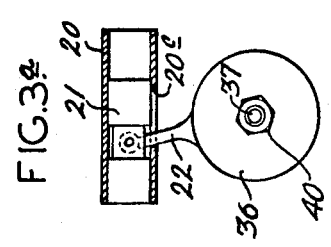

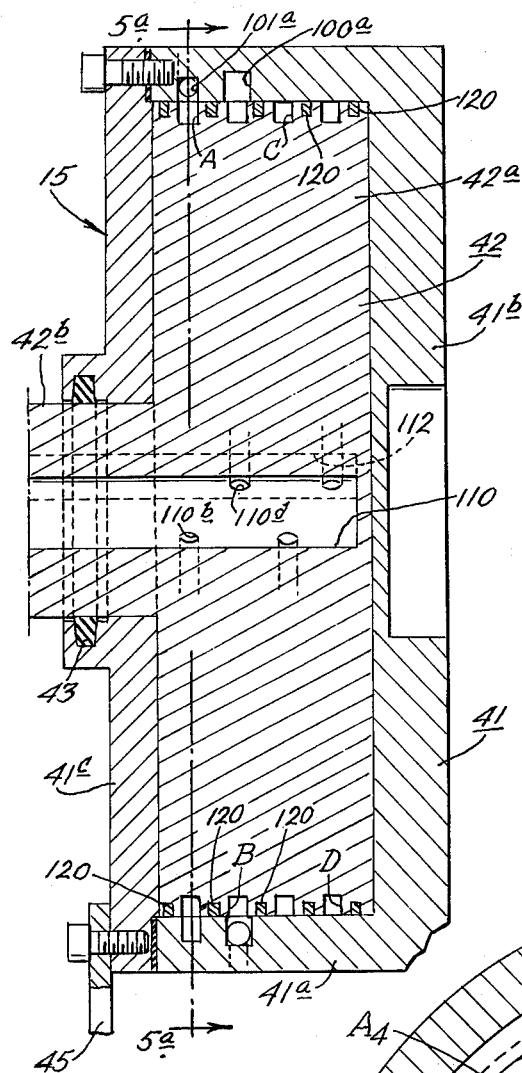
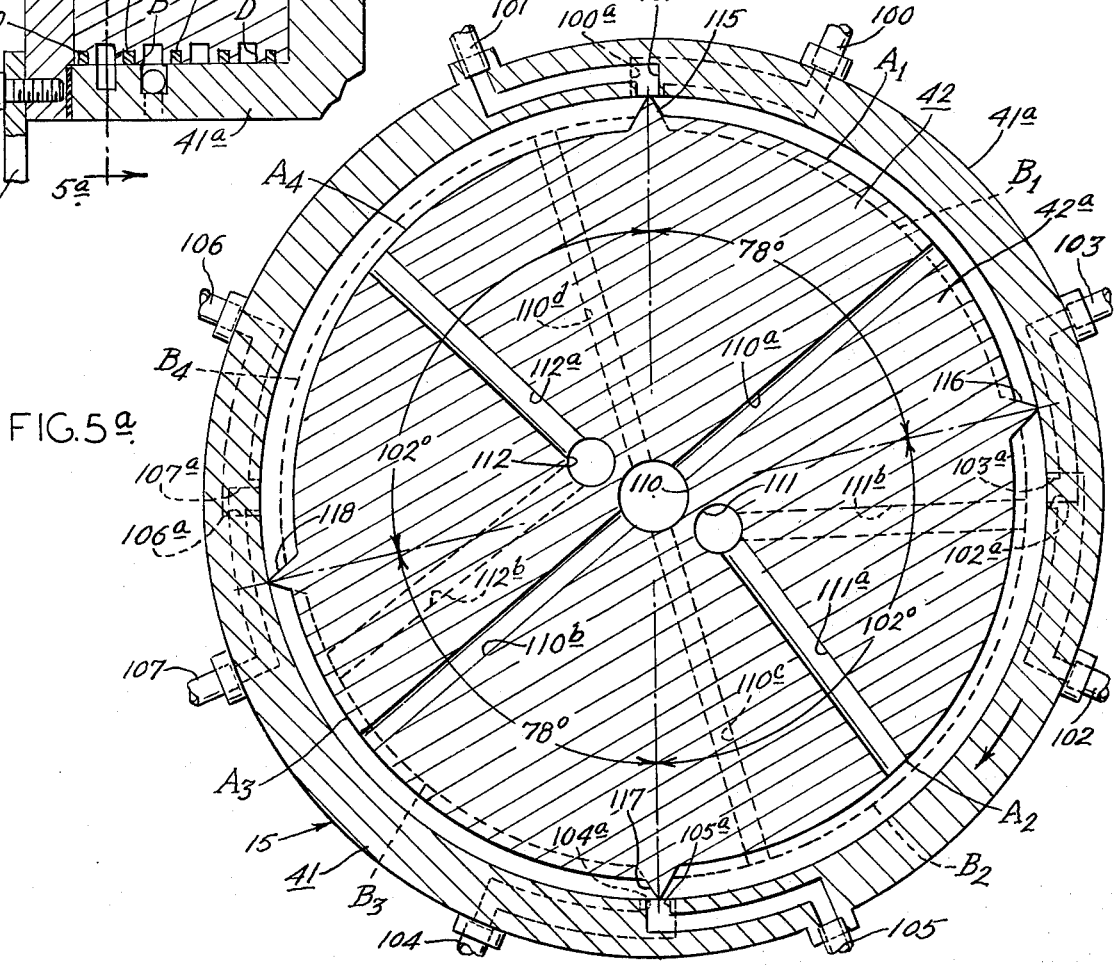
FIG.5.
FIG.5a.

FIG.6.a
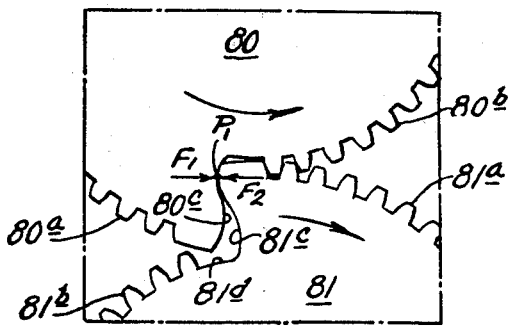
FIG.6.b
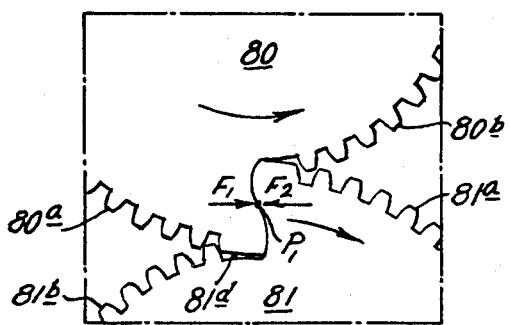
FIG.6.c
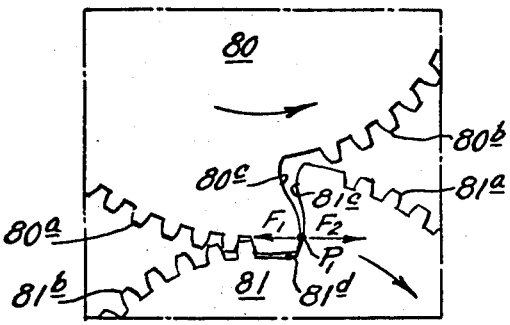
FIG.7.
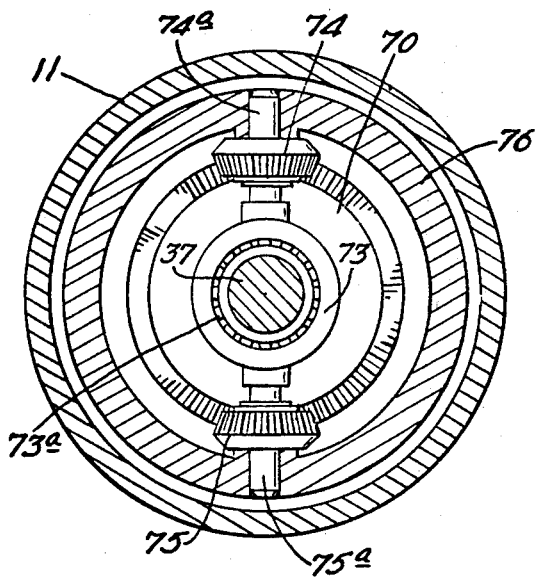

OSCILLATING PISTON ENGINE

The present application is a continuation-in-part of my copending application Ser. No. 564,782 filed on Apr. 3, 1975 for Oscillating Piston Internal Combustion Engine, now U.S. Pat. No. 3,974,801.

The present invention relates to engines which operate on a pressure fluid such as steam or compressed air, and more particularly, the present invention relates to steam or air engines of the oscillating-piston type.

My U.S. Pat. No. 3,974,801 discloses an internal combustion engine of the oscillating-piston type. The engine comprises a bank of combustion chambers rotatable in an annular path on the front of an engine block. An output shaft protrudes from the rear of the block and is connected to the cylinder bank by gearing means which functions to convert the oscillating motion of the cylinders and pistons into unidirectional rotation of the output shaft. The pistons are oscillated in the cylinders by the expansion of gases which are ignited by spark plugs mounted at opposite ends of the cylinders and energized alternately by an ignition system which supplies electrical energy to the plugs in timed relation with the rotation of the combustion chambers. Means is provided to admit a fuel-air mixture to the cylinders and to exhaust the burnt mixture from the cylinders.

Although my above-described internal combustion engine may function satisfactorily for its intended purpose, there are applications wherein engines powered by steam or compressed air are preferable to internal combustion engines.

With the foregoing in mind, it is a primary object of the present invention to provide a novel oscillating piston engine which can be operated on a pressure fluid such as steam or compressed air.

It is another object of the present invention to provide an oscillating piston steam or air engine which has a large commonality of parts with my oscillating piston internal combustion engine.

A further object of the present invention is to provide an efficient oscillating piston steam engine.

More specifically, the present invention provides an engine which comprises a block, at least one pair of cylinders mounted in tangentially-opposed relation on diametrically opposite sides of an axis through the block, means mounting the cylinders for rotation in a bank in unison in a substantially annular path about the axis, a double-acting piston movable axially in each cylinder between the ends thereof, means mounting the pistons for axial movement in the cylinders and for rotation in unison about the axis, control means operable in response to rotation of the cylinders to connect opposite ends of each cylinder to sources of working pressure fluid at different pressure levels in alternating timed relation for causing the pistons and cylinders to oscillate relative to one another as they rotate about the axis, an output shaft journalled in the engine block, and gearing means in the engine block connecting the cylinder mounting means and the piston mounting means together and to the output shaft for affording controlled relative motion between the pistons and the cylinders and for converting the relative motion into unidirectional rotation of the output shaft. The control means includes rotary valving means which operates automatically when the pistons reach the ends of their strokes to reverse the connection of the cylinders to the pressure fluid source to drive the pistons in the opposite direction.

These and other objects, features and advantages of the present invention should become apparent from the following description when taken in conjunction with the accompanying drawings in which:

FIGS. 3a–3g are schematic diagrams illustrating the relative positions of a piston and cylinder at different points during one complete cycle of oscillation of a piston in a cylinder;

FIGS. 4a–4g are schematic diagrams illustrating the engaged sector gears in the gear assembly at positions corresponding to the piston and cylinder positions illustrated in FIGS. 3a–3g;

FIG. 5 is an enlarged sectional view of the control valving means employed to alternately pressure and exhaust opposite ends of the cylinders;

FIG. 5a is a sectional view of the control valving means taken on line 5a—5a of FIG. 5;

FIGS. 6a–6c are greatly enlarged views of the area indicated in FIG. 4d illustrating the sequential force transfer between the sector gears; and FIG. 7 is a sectional view taken on line 7—7 of FIG. 2.

Figure 1:
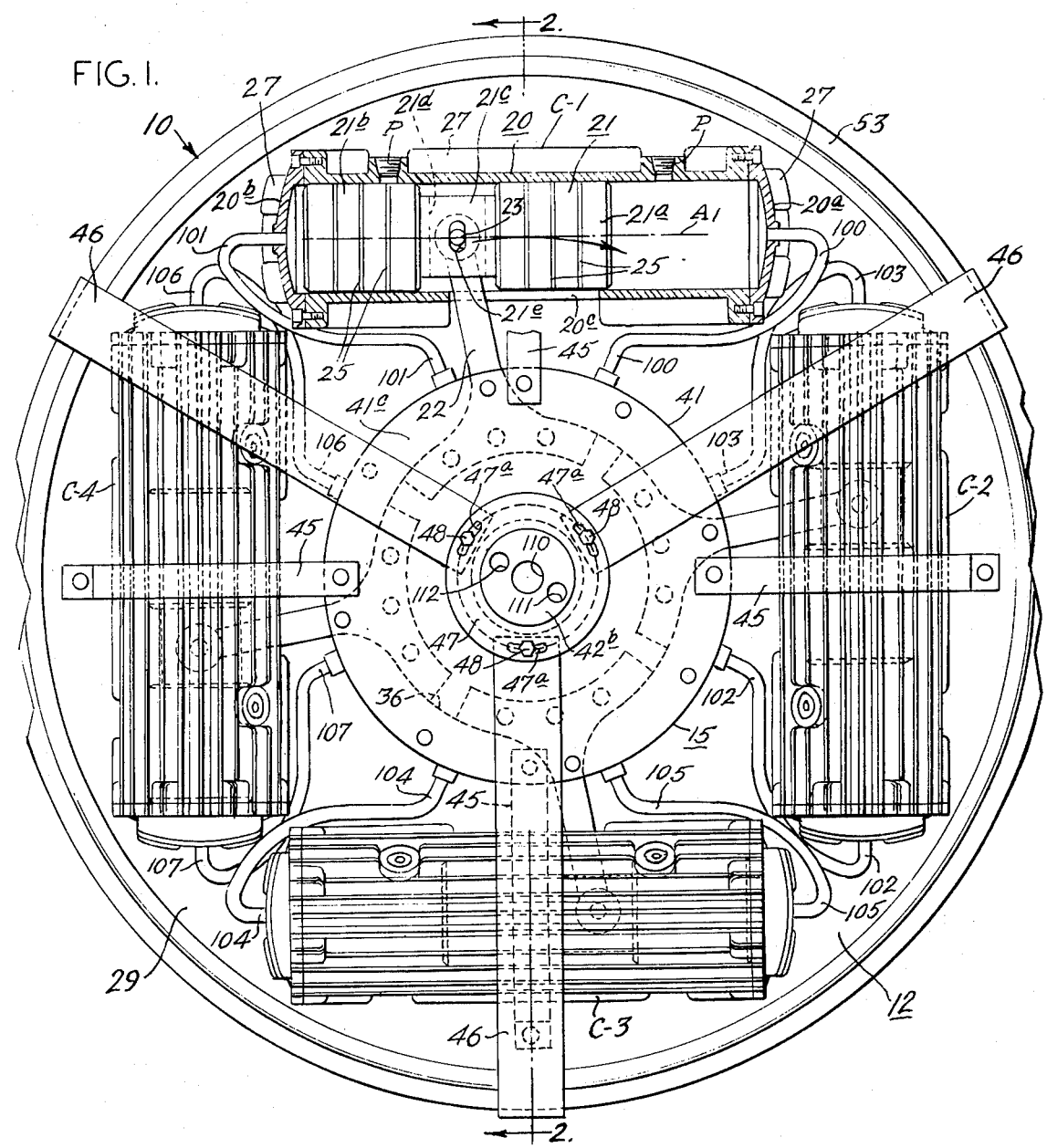
FIG. 1 is a front elevational view of an oscillating piston steam engine embodying my invention.
Figure 2:
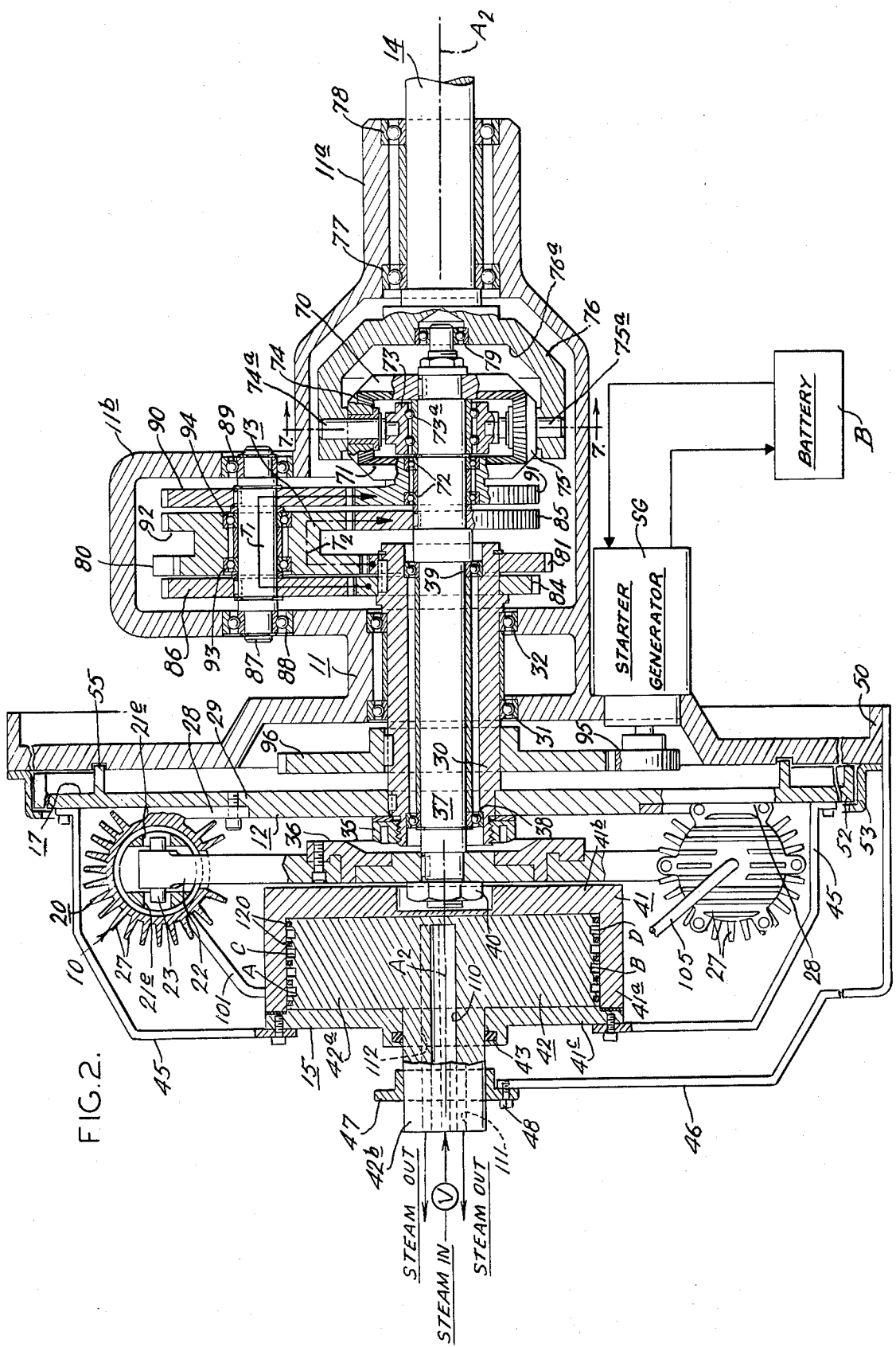
FIG. 2 is a longitudinal sectional view of the engine illustrated in FIG. 1, the view taken on line 2—2 of FIG. 1.

Referring now to the drawings, FIGS. 1 and 2 illustrate an oscillating piston engine 10 designed to run on a pressure fluid such as steam or compressed air. In brief, engine 10 comprises a block or frame 11, a bank 12 of piston-cylinder assemblies C-1, C-2, C-3 and C-4 located on the front of the block 11, a gear assembly 13 mounted in the block 11 and drivingly connected to the bank 12, and an output shaft 14 protruding from the rear of the block 11 and drivingly connected to the gear assembly 13. A control valving assembly 15 is provided at the front of the engine 10 for supplying the pressure fluid to the piston-cylinder bank 12 to power the engine 10. The piston-cylinder assemblies C-1, C-2, C-3, and C-4 (designated in the clockwise direction beginning at the top or 12 o'clock position in FIG. 1) are rotatable about an engine axis $A_2$ during operation of the engine 10. Each assembly is constructed similar to the other, so that for purposes of explanation hereinafter, reference will be made to the top piston-cylinder assembly C-1.

The top piston-cylinder assembly C-1 includes a cylinder 20 and a piston 21 mounted for displacement axially therein. The longitudinal axis $A_1$ of the cylinder 20 is disposed tangential with respect to a circle concentric with the engine axis $A_2$. The cylinder assembly C-3 is located diametrically opposite the cylinder assembly C-1, and the cylinder assemblies C-2 and C-4 are located diametrically opposite one another and at 90° with respect to the cylinder assemblies C-1 and C-3. The cylinder assemblies C-1 through C-4 are mounted to a circular mounting plate 29 to rotate in unison about the axis $A_2$.

For instance, each cylinder, such as the cylinder 20, has cooling fins 27 and a depending flange 28 which is bolted to the front of the circular mounting plate 29. The cylinder-mounting plate 29 is keyed to a hollow outer cylindrical shaft 30 and is removably secured thereto by a nut 35. The cylinder mounting shaft 30 is journalled in the engine block 11 by axially-spaced, low-friction bearings 31 and 32.

When rotating in the direction indicated by the arrow in FIG. 1, the cylinders have leading and trailing ends, such as the leading end 20a of the cylinder 20 and the trailing end of 20b thereof.

During rotation of the cylinder bank 12, each piston 21 oscillates between the leading and trailing ends of each cylinder. In my patented engine, the pistons are reciprocated by the combustion of an air fuel mixture alternately at opposite ends of the cylinders. In accordance with the present invention, however, the pistons are oscillated by the alternate admission of steam to opposite ends of the cylinders.

As best seen in FIG. 1, the piston 21 is double-acting and has a leading head end 21a and a trailing head end 21b. The head ends 21a and 21b are connected together by an integral web 21c having a radially-extending slot 21d which receives a piston connecting rod 22. The connecting rod 22 projects upwardly through an elongated slot 20c in the bottom of the cylinder 20 in registry with the slots 21d in the bottom of the piston-connecting web 21c. The connecting rod 22 is secured to the piston 21 by a hardened pin 23 which is slidable vertically in a pair of aligned slots 21e,21e to afford movement of the pin 23 in an arcuate path during movement of the piston 21 in a straight line in the cylinder 20. Suitable sealing rings 25,25 are provided for each end of the piston 21.

The pistons rotate in unison with one another. To this end, the piston connecting rod 22 is secured to a hub 36 which is keyed to an inner piston shaft 37 and secured by a nut 40. The piston shaft 37 is journalled by axially spaced, low-friction bearings 38 and 39 inside the cylinder shaft 30. The piston connecting rods 22 extend outwardly from the hub 36 orthogonal to one another and thereby couple the pistons 21 together for movement in unison in their respective cylinders. Thus, all the pistons move together, and all the cylinders move together, but, as will be seen, the pistons and cylinders move relative to one another.

The relative movement between the piston 21 and the cylinder 20 as they move apart during expansion of the steam in the ends of the cylinders 20 are converted into a unidirectional output torque in the output shaft 14. To this end, the cylinder bank 12 and pistons are connected by means of the shafts 30 and 37 to the gear assembly 13 which also couples the shafts together so that the pistons and cylinders move in a predetermined relation with respect to one another during operation of the engine. For instance, as best seen in FIGS. 3a-3g, the gear assembly 13 is designed to couple the pistons and cylinders in such a manner as to cause the pistons to oscillate through one complete cycle as the cylinders rotate through an arc of 180°. As will be more fully explained hereinafter, the gearing assembly 13 converts the motion of the piston 21 relative to the cylinder during the first half of the cycle (FIGS. 3a-3d) into an output torque and converts the motion of the cylinder 20 relative to the piston 21 during the second half of the cycle (FIGS. 3d-3g) into an output torque. During the first half of the cycle, the piston rod 22 moves through an arc of 102° while the cylinder 20 moves through an arc of 78°. However, during the second half of the cycle, the cylinder 20 moves through an arc of 102° while the piston rod 22 moves through an arc of only 78°. Of course, for one complete revolution of the cylinder bank 12 about its axis $A_2$ each piston 21 oscillates through two complete cycles inside its cylinder 20. As a result, four expansions occur within each cylinder for each revolution of the cylinder bank 12.

As best seen in FIG. 2, the gear assembly 13 includes a piston shaft ring gear 70 keyed to the piston shaft 37 near the rear of the block 11. A cylinder shaft ring gear 71 confronts the piston ring gear 70 and is mounted for rotation relative to the piston shaft 37 by a pair of low-friction bearings 72,72. A pair of planetary gears 74 and 75 engage the ring gears 70 and 71, and the planetary gears 74 and 75 are mounted in a recess 76a in the front of a yoke 76 integral with the output shaft 14. As best seen in FIG. 7, the planetary gears are mounted by pintles 74a and 75a, respectively, which protrude radially outward in opposite directions from a collar 73 mounted for rotation on the shaft 37 between the ring gears 70 and 71 by a bearing assembly 73a. The output shaft 14 is mounted by a low-friction bearings 77 and 78 in a rearward protrusion 11a of the engine block 11, and the rear end of the piston shaft 37 is journalled in the yoke 76 by a low-friction bearing assembly 79. With this structure, rotation of the piston ring gear 70 in the clockwise direction (FIG. 1) relative to the cylinder ring gear 71 causes the planetary gears to rotate the yoke 76 in the clockwise direction. Of course, rotation of the cylinder ring gear 71 relative to the piston ring gear 70 causes the yoke 76 also to rotate in the clockwise direction. As will be seen, during the first half of the cycle (FIGS. 3a-3d) the piston ring gear 70 rotates relative to the cylinder ring gear 71 to rotate the output shaft 14; however, during the second half of the cycle (FIGS. 3d-3g) the cylinder ring gear 71 rotates relative to the piston ring gear 70 to rotate the output shaft 14 in the clockwise direction. It is noted that output shaft 14 can overrun the rotational rates of the cylinder and piston shafts to provide an "overdrive" which may be desirable in certain applications.

The cylinder ring gear 71 is connected to the cylinder shaft 30 by means of a first gear train $T_1$ indicated by the solid line arrow in FIG. 2. The piston ring gear 70, on the other hand, is connected to the cylinder shaft 30 by a second gear train $T_2$ indicated by the broken line arrow in FIG. 2. The first gear train $T_1$ has a sector gear 80, and the second gear train $T_2$ has a sector gear 81. As best seen in FIG. 4a, each sector gear, such as the sector gear 80 has two diametrically-opposed pairs of tooth arrays 80a,80a and 80b,80b, with the pair 80a alternating with the pair 80b. The pair of tooth arrays 80a are on a larger or major pitch diameter than the pair 80b which are on a smaller or minor pitch diameter. The sector gear 81 has similar opposed pairs of tooth arrays 81a and 81b, the gears 80 and 81 being of the same dimetral pitch to mesh together. As illustrated in FIG. 4a, the minor diameter array of teeth 80b on the upper sector gear 80 engage the major diameter array of teeth 81a of the lower sector gear 81 at the start of the cycle. The minor arrays of teeth 80b and 81b of each gear extend through an arc defined by an included angle of 102°, and the major arrays of teeth 80a and 81a extend through an arc of 78°. It is noted that the angular extent of the minor array 80b and 81b corresponds with the angular movement of the piston connecting rod 22 between the positions indicated schematically in FIGS. 3a-3d. The angular extent of the arrays of teeth 80a and 81a, on the other hand, corresponds with the displacement of the cylinder 20 through an arc of 78° between the position indicated in FIG. 3a and the position indicated in FIG. 3d.

During the first half of the cycle (FIGS. 3a-3d and 4a-4d) the minor array of teeth 80b of the upper sector gear 80 (connected by the gear train $T_2$ with piston input ring gear 70) engages the major array of teeth 81a of the lower sector gear 81 (secured to the cylinder shaft 30). At the end of the first half of the cycle, indicated schematically in FIGS. 3d and 4d, a transition occurs between the sector gears 80 and 81 so that during the second half of the cycle (FIGS. 3d-3g and 4d-4g) the minor array of teeth 80b of the upper sector gear 80 engage the major array of teeth 81a of the lower sector gear 81. At the midpoint of the cycle (FIGS. 3d and 4d) the transition between the engaged teeth occurs as illustrated in FIGS. 6a-6c. As seen therein, the sector gears 80 and 81 provided with surfaces 81c which are designed to transfer points of contact between the pitch diameters smoothly from the major pitch diameter of the sector gear 81 to its minor pitch diameter and to transfer the point of contact smoothly from the minor pitch diameter of the sector gear 80 to its major pitch diameter. As best seen in FIGS. 6a-6c, the surface 80c has an S-shaped configuration, and the surface 81c has a corresponding configuration, and the gear 81 is relieved at 81d between the surface 81c and the first tooth in the array 81b, as is the gear 80. Thus, with this structure, the point of contact $P_1$ between the sector gear 80 and the sector gear 81 moves radially between the surfaces 80c and 81c in the manner illustrated in FIGS. 6a-6c to effect smooth transfer of load from one sector gear to the other. The lower sector gear 81 (keyed to the cylinder shaft 30) rotates in synchronism with the cylinder shaft 30, and the upper sector gear 80 (connected in the gear train $T_2$) rotates in synchronism with the piston shaft 37.

As best seen in FIG. 2, the first gear train $T_1$ includes a first spur gear 84 keyed to the cylinder shaft 30 adjacent the lower sector gear 81. The second gear train $T_2$ includes a second spur gear 85 which is keyed to the piston shaft 37 to rotate therewith. The pitch diameter of the first spur gear 84 in the first gear train $T_1$ and the pitch diameter of the second spur gear 85 in the second gear train $T_2$ are equal and intermediate the major and minor pitch diameters of the sector gears 80 and 81.

The first gear train $T_1$ also includes a pair of spur gears 86 and 90 keyed in axially-spaced relation to a jack shaft 87 journalled for rotation by bearings 88 and 89 in a hollow upward protrusion 11b of the engine block 11. The first gear train $T_1$ also includes a third spur gear 91 which is secured to the cylinder ring gear 71 and which is rotatable relative to the piston shaft 37 with the ring gear 71. The third spur gear 91 meshes with the spur gear 90 in the pair 86 and 90 on the jack shaft 87. The second gear train $T_2$ includes a fourth spur gear 92 rotatable with the upper sector gear 80 relative to the jack shaft 87 by means of a pair of axially-spaced bearings 93 and 94. The fourth spur gear 92 meshes with the second spur gear 85 which is keyed to the piston shaft 37.

Depending on where the pistons and cylinders come to rest when steam pressure is cut-off, it may be necessary for the cylinder bank 12 to be pivoted. For this purpose, and for the purpose of generating electricity to run auxiliary equipment, a starter-generator — SG is provided. The starter-generator SG rotates a pinion gear 95 which meshes with a starter spur gear 96 keyed to the cylinder shaft 30. The starter generator SG is supplied with electrical energy from the storage battery B to rotate the pinion 95 for turning the cylinder shaft 30 clockwise (FIG. 1) to pivot the cylinder bank 12 about its axis. Of course, during engine operation, the starter generator SG is driven to supply electrical energy to the battery B for auxiliary equipment.

Before discussing operation of the engine to generate power, a description of the movement of the cylinders and pistons and the gears in the gear assembly 13 during cranking of the engine is believed to be helpful in understanding the cooperation of the various elements of the engine.

The starter generator SG rotates the cylinder shaft 30 in the clockwise direction (FIG. 1) during cranking. At the beginning of the cycle, indicated schematically in FIGS. 3a and 4a, it may be seen that the piston 21 in in its leftwardmost limit position in the cylinder 20, and the cylinder 20 is in the 12 o'clock position. At that instant, the cylinder sector gear 81 is engaged with the piston sector gear 80 in the manner illustrated in FIG. 4a. As seen therein, rotation of the cylinder shaft 30 in the clockwise direction causes the sector gear 81 also to rotate in the clockwise direction indicated by the arrow. The major array of teeth 81a on the cylinder sector gear 81 are illustrated at the beginning of their engagement with the minor array of teeth 80b of the piston sector gear 80.

Continued rotation of the cylinder shaft 30 in the clockwise direction through an angle $\alpha_1$ (FIG. 4b) causes the cylinder sector gear 81 to pivot the piston sector gear 80 through an angle $\alpha_2$ which is greater than the angle $\alpha_1$ because the pitch diameter of the array 81b is greater than the pitch diameter of the array 80a. As a result, the spur gear 92 pivots through an angle $\alpha_2$ which in turn causes the spur gear 85 connected to the piston shaft 37 to rotate through the same angle $\alpha_2$ by virtue of the fact that the pitch diameter of the spur gear 92 is the same as the pitch diameter of the spur gear 85. Accordingly, the piston shaft 37 pivots through a greater angle in the clockwise direction than does the cylinder shaft 30, so that as may be seen in FIG. 3b, the piston 21 advances rightward relative to the trailing end of the cylinder 20b as the cylinder 20 pivots clockwise.

This differential angular movement of the cylinder and piston shafts continues in the clockwise direction, so that when the cylinder shaft 30 is further pivoted into the position indicated in FIG. 4c the piston 21 advances further relative to the cylinder 20 as illustrated in FIG. 3c. Continued pivotal movement of the cylinder shaft 30 into the position indicated in FIG. 4d causes the piston 21 to advance into its rightwardmost limit position in the cylinder 20 as indicated in FIG. 3d. At this point, the gear transfer action occurs, and the array of teeth 81b which is on a smaller pitch diameter on the sector gear 81 than the major array of teeth 80a on the sector gear 80 engage one another. As a result, continued clockwise rotation of the cylinder shaft 30 causes the piston shaft 37 to advance through a smaller pivot angle, causing the cylinder 20 to move ahead of the piston 21 as indicated in FIG. 3e. Further rotation of the cylinder shaft 30 into the position indicated in FIG. 4f causes the cylinder 20 to advance further in the clockwise direction than the piston 21 as indicated in FIG. 3f. Of course, when the cylinder shaft 30 pivots into the position indicated in FIG. 4g, the piston has moved to its trailing limit position relative to the cylinder 20, and the cylinder is in the 6 o'clock position as indicated in FIG. 3g. Thus, in 180° of rotation of the cylinder shaft 30, the piston 21 is displaced from one end of the cylinder to the other to constitute one cycle.

At the beginning of the cycle, the sector gears are engaged as illustrated in FIG. 4a. That is, the minor array of teeth 80b of the piston sector gear 80 engages the major array of teeth 81a of the cylinder sector gear. Because the piston sector 80 is connected in the gear train $T_2$ it applies to the cylinder sector gear 81 a torque which is opposite in direction to the torque applied by the cylinder shaft 30. However, since the point of engagement of the sector gears 80 and 81 is located closer to the rotational axis of the piston sector 80 than to the cylinder sector 81, the torque applied by the piston sector 80 overcomes the counteracting torque applied by the cylinder sector 81. As a result, the cylinder sector gear 81 is pivoted clockwise, and the spur gear 84 is also pivoted clockwise. The gear 86 in the gear train $T_1$ is thereby rotated in the counterclockwise direction with its companion gear 90, and the gear 90 causes the spur gear 91 to rotate in the clockwise direction relative to the piston shaft 37. The spur gear 91 rotates the cylinder ring gear 71 clockwise relative to the piston ring gear 70, thereby causing the pinion gears 74 and 75 to rotate the yoke 76 to torque the output shaft 14.

This action continues during the first half of the cycle indicated in FIGS. 4a–4d, and 3a–3d. The cylinder gear 71 torques the output shaft 14 until the sector gears 80 and 81 rotate into the position indicated in FIG. 4d. At this point, a transfer action occurs between the sector gears to cause the cylinders 20,20 rather than the pistons 21,21 to torque the output shaft 14. To this end, the sector gears 80 and 81 are designed so that the point of contact $P_1$ (FIGS. 6a–6c) between them moves downwardly so that the lines of action of the forces $F_1$ and $F_2$ are transferred from a location closer to the rotational axis of the piston sector gear 80 to a location closer to the rotational axis of the cylinder sector gear 81. This action occurs when the cylinder and piston are in the position indicated in FIG. 3d and the control valving means 15 functions to reverse the application of pressure in the cylinders. The pressure reversal occurs as the point $P_1$ moves into a position closer to the rotational axis of the cylinder sector gear 81. Expansion of the steam then causes each piston 21 to move counterclockwise and each cylinder 20 to move clockwise. This causes the force $F_2$ to change direction, as does its reaction force $F_1$. Since the force $F_2$ is greater than the force $F_1$, the piston sector gear 80 is pivoted in the counterclockwise direction by the cylinder sector gear 81. The piston sector gear 80 rotates through an angle corresponding to the angle through which its companion spur gear 92 rotates. The angle, of course, is less than the angle through which the cylinder sector gear 81 rotates; however, because the spur gear 85 meshes with the spur gear 92 at a location spaced radially outward of the rotational axis of the cylinder sector 81 a distance greater than the corresponding radial location of the minor array of teeth 81b, the piston shaft 37 rotates through a greater angle than the cylinder shaft 30. Accordingly, the piston ring gear 70 keyed to the piston shaft 37 rotates relative to the cylinder ring gear 71 and causes the planetary gears 74 and 75 to rotate the yoke 76 also in the clockwise direction to torque the output shaft 14 during the period of the cycle indicated in FIGS. 4e and 4f corresponding to the movement of the piston 21 and cylinder 20 in the positions indicated in FIGS. 3e and 3f.

The application of torque by the cylinders to the output shaft 14 terminates when the cylinder 20 reaches the 6 o'clock position illustrated in FIG. 3g and the piston 21 reaches its rightwardmost or trailing limit position. At this point of time, the sector gears 80 and 81 again effect transfer of the forces along the surfaces 80c and 81c in the direction opposite the direction in which the transfer was effected in FIGS. 6a–6c. Of course, the cycle is repeated as the cylinder 20 continues to rotate from the 6 o'clock position to the 12 o'clock position so that in one complete rotation of the cylinder bank 12 about its axis $A_2$ two complete power cycles are effected.

In summary, the greater movement of the pistons relative to the cylinders during the first part of the cycle causes the gear assembly 13 to torque to the output shaft 14, and the greater movement of the cylinders relative to the pistons during the second half of the cycle causes the gear assembly 13 to torque the output shaft 14. It is noted that the cylinders and pistons are continuously moving in the clockwise direction (FIG. 1); however, the rates at which they move relative to one another vary so that the pistons may be regarded as oscillating relative to the cylinders or vice versa. Since the pistons do not change directions, a significant amount of energy is saved resulting in an efficient engine.

According to the present invention, the control means 15 alternately supplies steam and exhausts steam from opposite ends of each cylinder in timed relation for causing the pistons to oscillate in the cylinders during the operation of the engine 10. For example, steam is admitted to the trailing ends of the cylinders when they are in the 12, 3, 6 and 9 o'clock positions illustrated in FIG. 1, and steam is admitted to the leading ends of the cylinders when the pistons reach the ends of their strokes in the cylinders, such as when the piston 21 is in the position illustrated schematically in FIG. 3d. The reversal of steam pressure and exhaust coincides with the transfer action which takes place between the sector gears 80 and 81 as described above.

In the present invention, the control means 15 is a rotary valve which comprises a rotor 41 mounted on the front of the engine 10 centrally of the cylinder bank 12 and a stator 42 mounted inside the rotor 41. The rotor 41 is connected to opposite ends of each cylinder, and the stator 42 is connected to a steam supply and an exhaust sump. For instance, the rotor 41 is connected to the leading end 20a of the cylinder 20 by a conduit 100 and is connected to the trailing end 20b of the cylinder 20 by a conduit 101. The other cylinder assemblies C-2, C-3 and C-4 are similarly connected by leading and trailing conduits 103–107. Preferably, the conduits 100 and 102 are connected in threaded holes which are used to mount the spark plugs in my internal combustion engine, and the holes which served as exhaust ports in my internal combustion engine are closed by plugs P,P.

The rotor 41 is mounted to rotate with the cylinder bank 12 by a series of arms 45,45 which extend radially outward from the rotor 41 and which are bolted onto the front of the cylinder mounting plate 29. As best seen in FIG. 2, the rotor 41 has a cylindrical peripheral wall 41a extending forwardly from a rear wall 41b spaced from the front of the piston mounting hub 36 and piston rod 22. A circular cover plate 41c extends across the front of the rotor 41 and is removably secured to the peripheral wall 41a of the rotor 41 by a series of bolts. The stator 42 has a cylindrical body 42a which fits inside the rotor 41, and the stator 42 has a mounting neck 24b which extends frontward through a packing gland 43 on the rotor cover 41c. The stator 42 is secured to the engine block by a series of arms 46,46 which extend outwardly from a central hub 47 fixedly secured to the stator neck 24b. Preferably, the hub 47 has slots 47a,47a (FIG. 1) which receive bolts 48,48 threadedly engaging the arms 46,46 to enable the hub 47, and hence the stator 42, to be pivoted about the engine axis $A_2$ to afford adjustment of the time of the steam supply and exhaust functions.

Steam under pressure is supplied to the stator 42 through a valve V which is connected to a supply passage 110 extending centrally in the stator neck 42b and into the center of the stator body 42a. Steam which has expanded in the cylinders and which is at a lower pressure level is exhausted through a pair of exhaust passages 111 and 112 which extend along opposite sides of the supply passages 110 in the stator neck 42b. In the illustrated embodiment, the exhaust passages 111 and 112 open to the atmosphere and hence, ambient pressure.

In order to connect the steam supply and exhaust passages 110-112 to the cylinders, the rotor 41 and the stator 42 are provided with port and groove means which register with one another in a predetermined sequence during rotation of the rotor 41. To this end, the periphery of the stator 42 has a series of axially-spaced grooves A, B, C and D which register with ports 100a - 107a in the rotor wall 41a. The ports 100a - 107a are in fluid communication with the steam supply and exhaust conduits 100 - 107, respectively. The ports 100a and 105a are located diametrically opposite one another the plane of the groove A at the 12 and 6 o'clock positions, and the ports 101a and 104a are similarly located in the axially spaced plane of the groove B. The ports 102a and 103a and the ports 106a and 107a are similarly located at the 3 and 9 o'clock positions but in the planes of the grooves C and D, respectively.

The grooves A - D are connected to the steam supply and exhaust passages 110-112 by passages in the stator. For instance, the groove A is connected to the steam supply passage 110 by diametrically extending passages 110a and 110b, and the groove B is connected to the steam supply passage 110 by similarly extending passages 110c and 110d. The steam exhaust passages 111 and 112 are connected to the groove A by diametrically extending passages 111a and 112a and the steam exhaust passages 111 and 112 are connected to the groove B by similarly extending passages 111b and 112b. Of course, the steam supply and exhaust passages are likewise connected to the other grooves C and D. In order to prevent leakage across the grooves A-D during operation of the engine, sealing rings 120,120 are mounted around the periphery of the stator 42 on opposite sides of each groove.

Each groove is divided into segments, the length of which determines the duration of the period of steam supply and exhaust. For instance, the groove A is divided into peripheral segments $A_1$, $A_2$, $A_3$ and $A_4$ and the groove B is similarly divided into segments $B_1-B_4$. These groove segments are separated by outwardly-extending tapered divider walls 115, 116, 117 and 118. The grooves C and D are similarly divided; however, both segments are displaced 90° clockwise to correspond with the location of the ports 102a, 103a and 106a, 107a at the 3 and 9 o'clock positions for the cylinder assemblies C-2 and C-4. In the illustrated embodiment, the segment divider walls 115-118 are tapered to prevent the pistons and cylinders from locking-up at the ends of the piston strokes and possibly adversely affecting the transfer action between the sector gears 80 and 81.

The groove segments $A_1$, $B_1$ and $A_3$ and $B_3$ control the supply and exhaust of steam, respectively, for the cylinder assemblies C-1 and C-3 for the first half of the cycle (FIGS. 3a–3d). The groove segments $B_2$, $A_2$ and $B_4$, $A_4$ control the supply and exhaust function respectively for the same cylinders during the second half of the cycle (FIGS. 3d–3g). For example, with the rotor 41 rotating in the direction of the arrow in FIG. 5a, the groove segments $A_1$ and $A_3$ cause steam to be supplied to the ports 101a and 105a and thus to the trailing ends of the cylinder assemblies C-1 and C-3, respectively. At the same time, the opposite leading ends of the cylinder assemblies C-1 and C-3 are exhausted through the ports 100a and 104a and into the groove segments $B_1$ and $B_3$. Thus, the pistons move clockwise in the cylinders (see FIGS. 3a–3d) until they reach the ends of their strokes which, for the first half of the cycle, occurs when the cylinders have rotated through an angle of 78° which is the arcuate extent of the groove segments $A_1$, $B_1$ and $A_3$, $B_3$.

When the pistons reach the ends of their strokes (FIG. 3d) the ports 100a, 101a and 104a, 105a register with the tapered segment divider walls 116 and 118, and the transfer action between the sector gears 80 and 81, described heretofore, takes place. At this moment, the steam pressure and exhaust connections to the cylinders undergo reversal.

After these ports (100a, 101a, 104a, 105a) have passed the walls 116 and 118, the ports 100a and 104a register with the groove segments $B_2$ and $B_4$ to cause steam to be supplied to the leading ends of the cylinders C-1 and C-3. The ports 101a and 105a register with the groove segments $A_2$ and $A_4$ to cause steam to be exhausted from the trailing ends of the same cylinders. The arcuate extent of the groove segments $A_2$, $B_2$, and $A_4$, $B_4$ is 102°, corresponding to the rotation of the cylinders through the 102° (FIGS. 3d–3g).

During the aforedescribed events the other cylinder assemblies C-2 and C-4 are similarly being supplied and exhausted through similar segments in the grooves C and D. Thus, steam is supplied to and exhausted from the cylinders for one complete oscillation of each piston in its cylinder.

The steam pressure can be varied to suit the desired operating conditions of the engine. For example, this may be accomplished by adjusting the valve V in the steam supply line. Also, the engine speed may be controlled in this manner.

Reference herein has been made to the use of steam as the working pressure fluid. It should be understood, however, that compressed air or other compressible fluids may be utilized as a pressure fluid in certain applications. Also, if desired, the engine may be converted into an air compressor simply by supplying power to the starter to crank the cylinder bank 12.

In view of the foregoing, it should be apparent that the present invention has provided an engine capable of running efficiently on a pressure fluid.

While a preferred embodiment of the present invention has been described in detail, various modifications, alterations and changes may be made without departing from the spirit and scope of the present invention as defined in the appended claims.

I claim:

1. An engine, comprising:
   a block, at least one pair of cylinders mounted tangentially on diametrically opposite sides of an axis extending through the block, means mounting said cylinders for rotation in a bank in unison in a substantially annular path about said axis with one end of each cylinder leading and the other end trailing, a double-acting piston displaceable axially in each cylinder between opposite ends thereof, means mounting said pistons for axial movement in said cylinders and for rotation in unison about said axis relative to said cylinder mounting means, control means operable in response to rotation of said cylinders to supply pressure fluid to and to exhaust pressure fluid from opposite ends of each cylinder in alternating timed relation for causing said pistons and cylinders to move in alternate directions relative to one another as they rotate about the axis, said control means including a rotary valve having a rotor and a stator, means mounting said rotor for rotation with said cylinder mounting means, conduit means connecting said rotor to opposite ends of each cylinder, and passage means in said stator for supplying pressure fluid to said conduit means and exhausting pressure fluid therefrom during rotation of said rotor relative to said stator, said passage means including groove means and port means in said stator and rotor adapted to register with one another upon rotation of said rotor to connect one end of each cylinder to said pressure fluid source and the opposite end of each cylinder to exhaust and to reverse said connection when each piston reaches the end of its stroke in its cylinder so that the opposite end of each cylinder is connected to said pressure fluid source and said one end is connected to exhaust until the piston reaches the end of its return stroke in its cylinder, said groove means including a series of arcuate grooves each divided into segments having arcuate extents corresponding to the arcuate extent of motion of the piston relative to the cylinder during each portion of the stroke of the piston in its cylinder, an output shaft journalled in said engine block, and gearing means in said engine block connecting said cylinder mounting means and said piston mounting means together and to said output shaft for affording controlled relative motion between the pistons and the cylinders and for converting said relative motion into unidirectional rotation of said output shaft, said gearing means including a differential gear assembly having a pair of input ring gears rotatable relative to one another, a pair of output planetary gears engaging said ring gears, and a yoke connected to said output shaft and rotatably mounting said planetary gears, a first gear train connecting one of said input ring gears to said cylinder mounting means, a second gear train connecting the other of said input ring gears to said piston mounting means, one of said gear trains including a complementary pair of sector gears interengaged with one another, one of said pair of sector gears being rotatable in synchronism with said cylinder mounting means and the other of said pair of sector gears being rotatable in synchronism with said piston mounting means, whereby the sector gears cooperate with the gear trains to impart unidirectional output torque to said output shaft.

2. An engine according to claim 1 wherein each sector gear has diametrically-opposed arrays of teeth disposed in alternate pairs with one pair having a minor pitch diameter and the other pair having a major pitch diameter, said sector gears being engaged so that a minor array of teeth on one sector gear engages a major array of teeth on the other sector gear; and wherein said first gear train includes a first spur gear rotatable in synchronism with said one sector gear and said second gear train including a second spur gear rotatable in synchronism with said other sector gear, said first and second spur gears having the same pitch diameter which is intermediate said major and minor pitch diameters of said sector gears.

3. An engine according to claim 2 wherein the ports in said rotor and the grooves are in said stator, and the arcuate extent of the supply and exhaust grooves in the stator for the trailing end of each cylinder corresponds to the arcuate extent of said major tooth array on said one sector gear, and the arcuate extent of the supply and exhaust grooves in the stator for the leading end of each cylinder corresponds to the arcuate extent of said minor tooth array on said one sector gear.

4. An engine according to claim 1 including means mounting said stator for limited pivotal movement about said axis to afford adjustment of the timing of the supply and exhaust of said pressure fluid.

* * * * *